(12) United States Patent
Eskander

(10) Patent No.: US 12,452,370 B2
(45) Date of Patent: Oct. 21, 2025

(54) CONNECTING A USER DEVICE TO AN AGENT DEVICE AT A CONTACT CENTER

(71) Applicant: Zoom Communications, Inc., San Jose, CA (US)

(72) Inventor: Maikl Adly Abdel-Malek Eskander, Seattle, WA (US)

(73) Assignee: Zoom Communications, Inc., San Jose, CA (US)

(*) Notice: Subject to any disclaimer, the term of this patent is extended or adjusted under 35 U.S.C. 154(b) by 306 days.

(21) Appl. No.: 18/161,416

(22) Filed: Jan. 30, 2023

(65) Prior Publication Data

US 2024/0259496 A1 Aug. 1, 2024

(51) Int. Cl.
*H04M 3/51* (2006.01)
*G06F 40/20* (2020.01)
*G10L 15/18* (2013.01)
*G10L 15/22* (2006.01)
*H04M 3/523* (2006.01)

(52) U.S. Cl.
CPC .......... *H04M 3/5183* (2013.01); *G06F 40/20* (2020.01); *G10L 15/18* (2013.01); *G10L 15/22* (2013.01); *H04M 3/5231* (2013.01); *H04M 3/5233* (2013.01); *H04M 3/5235* (2013.01); *H04M 2201/40* (2013.01)

(58) Field of Classification Search
CPC ............. H04M 3/5183; H04M 3/5231; H04M 3/5233; H04M 3/5235; H04M 2201/40; G06F 40/20; G10L 15/18; G10L 15/22
See application file for complete search history.

(56) References Cited

U.S. PATENT DOCUMENTS

| | | | |
|---|---|---|---|
| 9,185,221 B1* | 11/2015 | Billman | H04M 3/5183 |
| 9,924,033 B2 | 3/2018 | Sharpe et al. | |
| 10,044,866 B2 | 8/2018 | Sharpe et al. | |
| 10,097,644 B2 | 10/2018 | Sharpe et al. | |
| 2007/0206769 A1 | 9/2007 | O'Dell, III | |
| 2016/0119477 A1 | 4/2016 | Sharpe et al. | |
| 2016/0119478 A1* | 4/2016 | Sharpe | H04L 67/141 |
| | | | 379/265.09 |
| 2023/0247140 A1* | 8/2023 | Li | H04M 3/5233 |
| | | | 379/266.01 |

* cited by examiner

*Primary Examiner* — Akelaw Teshale
(74) *Attorney, Agent, or Firm* — Young Basile Hanlon & MacFarlane, P.C.

(57) ABSTRACT

A server receives a query for connecting a user device to an agent device at a contact center server. The server determines, based on the query, a set of features of an agent associated with the agent device. The server determines that the agent having the set of features is available. The server calculates a priority score for the user device based on an elapsed time since the user device initiated a contact center engagement and additional stored data associated with the user device. The server connects the user device to the agent device based on the agent being available and based on the priority score for the user device exceeding a priority score for at least one other user device.

20 Claims, 12 Drawing Sheets

800

|  | GOLD | SILVER | BRONZE |
|---|---|---|---|
| TARGET WAIT TIME (MINUTES) | 2 | 4 | 5 |
| SLOPE | 2 | 1.3 | 1 |
| PREDICTED FUTURE AWT (MINUTES) | 3.1 | 6.3 | 7.2 |
| PRIOR WEEK AWT (MINUTES) | 4.5 | 5.3 | 6.8 |

FIG. 8

CONNECTING A USER DEVICE TO AN AGENT DEVICE AT A CONTACT CENTER

FIELD

This disclosure relates to connecting a user device to an agent device at a contact center which may be implemented over a telephone or computer network.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 8 illustrates an example of a user interface for managing wait times of groups of users.

DETAILED DESCRIPTION

Figure 1:
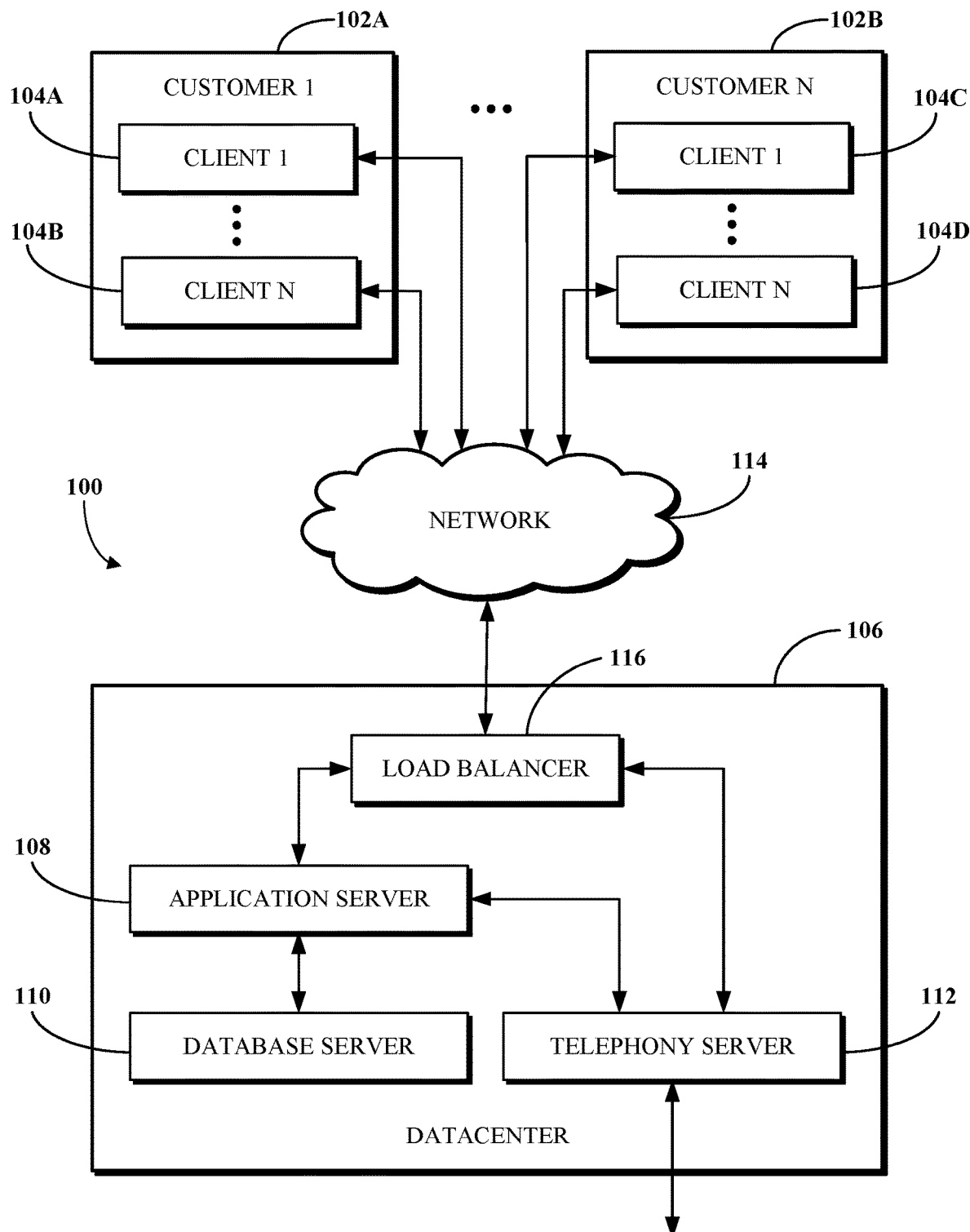
FIG. 1 is a block diagram of an example of an electronic computing and communications system.

The use of contact centers by or for service providers is becoming increasingly common to address customer support requests over various modalities, including telephony, video, text messaging, chat, and social media. In one example, a contact center may be implemented by an operator of a software platform, such as a unified communications as a service (UCaaS) platform, for a customer of the operator. Users of the customer may engage with the contact center to address support requests over one or more communication modalities enabled for use with the contact center by the software platform. In another example, the operator of such a software platform may implement a contact center to address customer support requests related to the software platform itself.

A user may access (e.g., via text-based messaging software, voice conferencing software, or video conferencing software) a contact center of a business (or other entity) in order to submit a query related to a product or a service of the business. Oftentimes, there are more user devices attempting to access agent devices at the contact center than there are agent devices at the contact center. In such cases, techniques for selecting a user device to communicate with an agent device when the agent device becomes available may be desirable. One naïve technique leverages a first-in-first-out queue of user devices for connection to the agent device, with the user device that has been waiting for the longest time being assigned to communicate with the agent device. However, some drawbacks of this naïve technique include that this technique may cause premium users (who may be more valuable to the business) to wait for a long time to be connected to the agent, and this naïve technique might connect a user to an agent who is not suitable for the user (e.g., does not have skills requested by the user or desirable by the user to respond to the query).

Implementations of this disclosure address problems such as these by selecting an appropriate contact center agent for a contact center user. A contact center server receives a query for connecting a user device to an agent device. The query may be typed or spoken in response to a prompt, from the contact center server, for the user of the user device to specify a reason for accessing the contact center. For example, the user may state in English, "I would like to refinance a vehicle loan." The contact center server determines, based on the received query, a set of features of an agent who should process the user's query. In the above example, the features of the agent may include being in the vehicle loan department, having the skill of handling refinancing applications, and speaking English. The user device may be placed on hold until an agent device of an agent having the set of features becomes available. At a future time, the contact center server determines that an agent device of an agent having the set of features is available for communication. The contact center server connects the user device to the agent device so that the agent at the agent device may respond to the query.

Some implementations relate to handling contention for contact center agents between contact center users. A contact center server receives indicia of user devices accessing the contact center server. The contact center server determines that a contact center agent device is available for communication with a user device of the user devices. The contact center server calculates a priority score for a user device based on an elapsed time since the user device initiated a contact center engagement and a priority level of an account associated with the user device, for example, the priority score P may be calculated using the formula $P=b*t$, where $t$ is the elapsed time and $b$ is a slope selected based on the priority level. In one example, an airline has a bronze priority level, a silver priority level, and a gold priority level, with membership in each level determined based on a total distance flown in the last year. For bronze members, $b=1$, for silver members, $b=1.5$, and for gold members, $b=2$. As a result, the time waiting to speak to an agent might be, on average, much less for gold members than for silver members, and for silver members than for bronze members. This rewards gold and silver members for their loyalty and encouraging them to use the airline for their travel needs. When an agent device becomes available for communication, the contact center server selects a user device for communicating with the available agent device based on the priority scores of the user devices. For example, the user device with the highest priority score may be selected. The contact center server connects the selected user device with the available agent device.

Some implementations relate to reducing contention for contact center agents between contact center users. A contact center server determines that contention for an agent having a set of features (e.g., being in the technology support department and speaking Spanish) exceeds a threshold contention value. The contention may correspond to or be calculated based on an average wait time (AWT) for a contact center user to be connected with the contact center agent. The AWT may be calculated as an average hold time (average amount of time an agent spends speaking with a user) multiplied by the number of users waiting divided by the total number of agents available to serve the users. The contact center server determines, based on a query or other data provided from a user device waiting to be connected to the agent device, that the query is other than urgent. For example, the fact that the query is other than urgent may be determined by prompting the user to specify whether their query is urgent or by applying natural language processing (NLP) techniques to the text or the spoken words in the query. The contact center server transmits, to the user device and based on the determination that the query is other than urgent, a prompt to accept a callback at a time when the contention for the agent having the set of features is below the threshold contention value. The prompt may ask the user to specify a time when they would like to receive the callback and a messaging address (e.g., a telephone number or an account identifier in a messaging, audio calling, or video calling service) at which they would like to receive the callback. In response to acceptance of the prompt, the contact center server provides the callback to the specified messaging address at the specified time.

Some implementations relate to a dashboard for adjustment of wait times. The contact center server presents, at an administrator device, a dashboard representing wait times and slopes of user devices with accounts at each priority level. The contact center server receives, from the administrator device, input data representing an adjusted target wait time or an adjusted slope for at least one priority level. The contact center server adjusts a priority score calculation engine that calculates priority scores based on the adjusted target wait time. The contact center server presents, via the dashboard, adjusted wait times of the user device associated with accounts at each priority level based on the adjusted priority score calculation engine.

As used herein, the phrase "average hold time" may include, among other things, an average amount of time the users of the user devices spends communicating with the contact center agent and not the amount of time the user spends waiting before being connected with the contact center agent. The average hold time may be a fixed value. Alternatively, the average hold time may be computed using artificial intelligence techniques based on at least one of the time of day, the day of the week, the calendar date, or the like.

As used herein, the term "engine" may include, among other things, a component of a physical computer or virtual machine that performs certain functions. The engine may be implemented using software that is stored in a memory and executed by processing circuitry. Alternatively, the engine may be hard-wired into the processing circuitry and implemented using hardware. In some cases, the engine may include both software and hardware components. An engine may include one or more sub-engines, each of which performs part of the functionality of the engine.

To describe some implementations in greater detail, reference is first made to examples of hardware and software structures used to implement connecting a user device to an agent device at a contact center based on features provided by the user of the user device or based on a priority score of the user. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
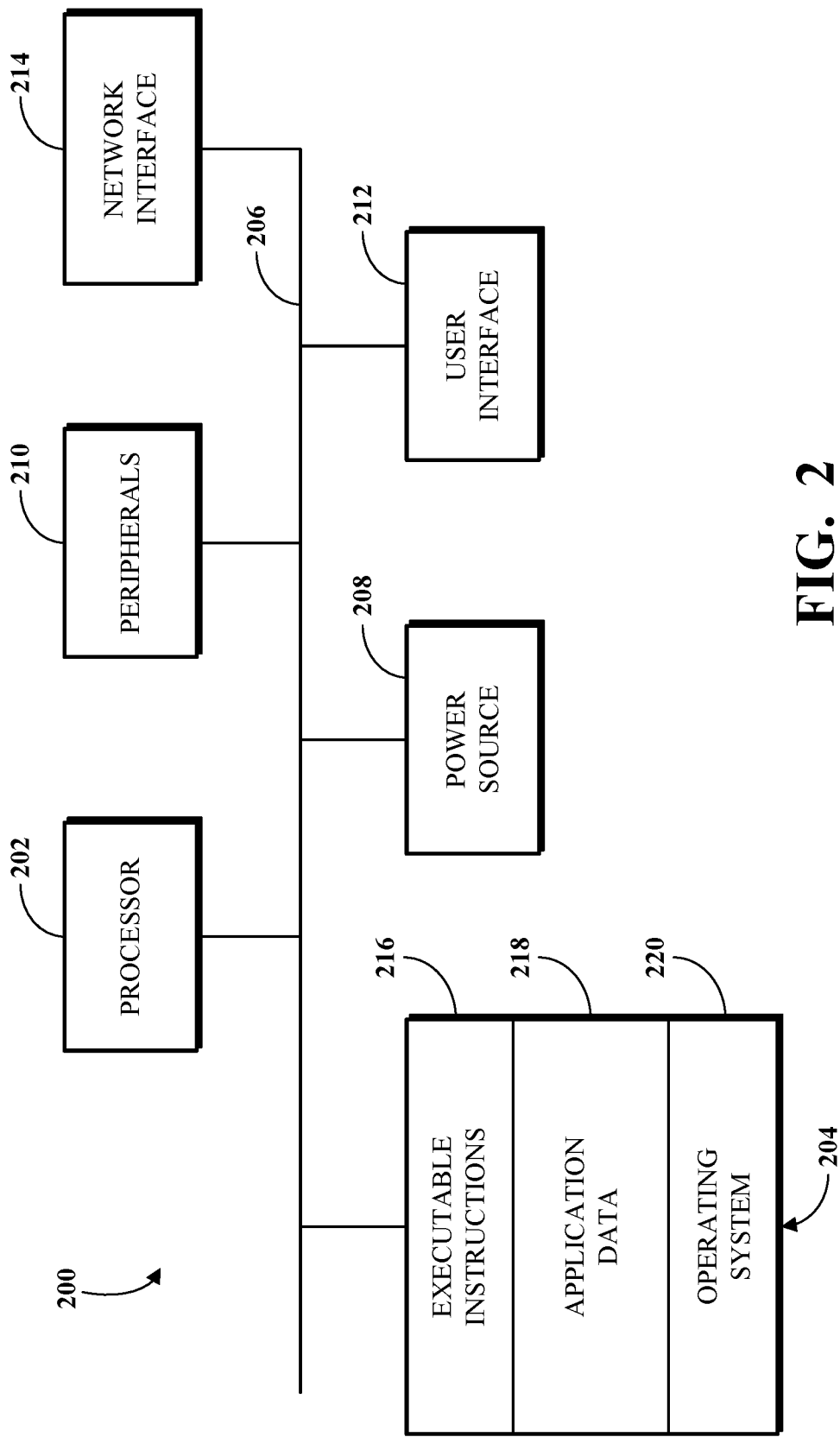
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may for example, be a positional input device, such as a mouse, touchpad, touchscreen, or the like; a keyboard; or another suitable human or machine interface device. An output interface may for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802. X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
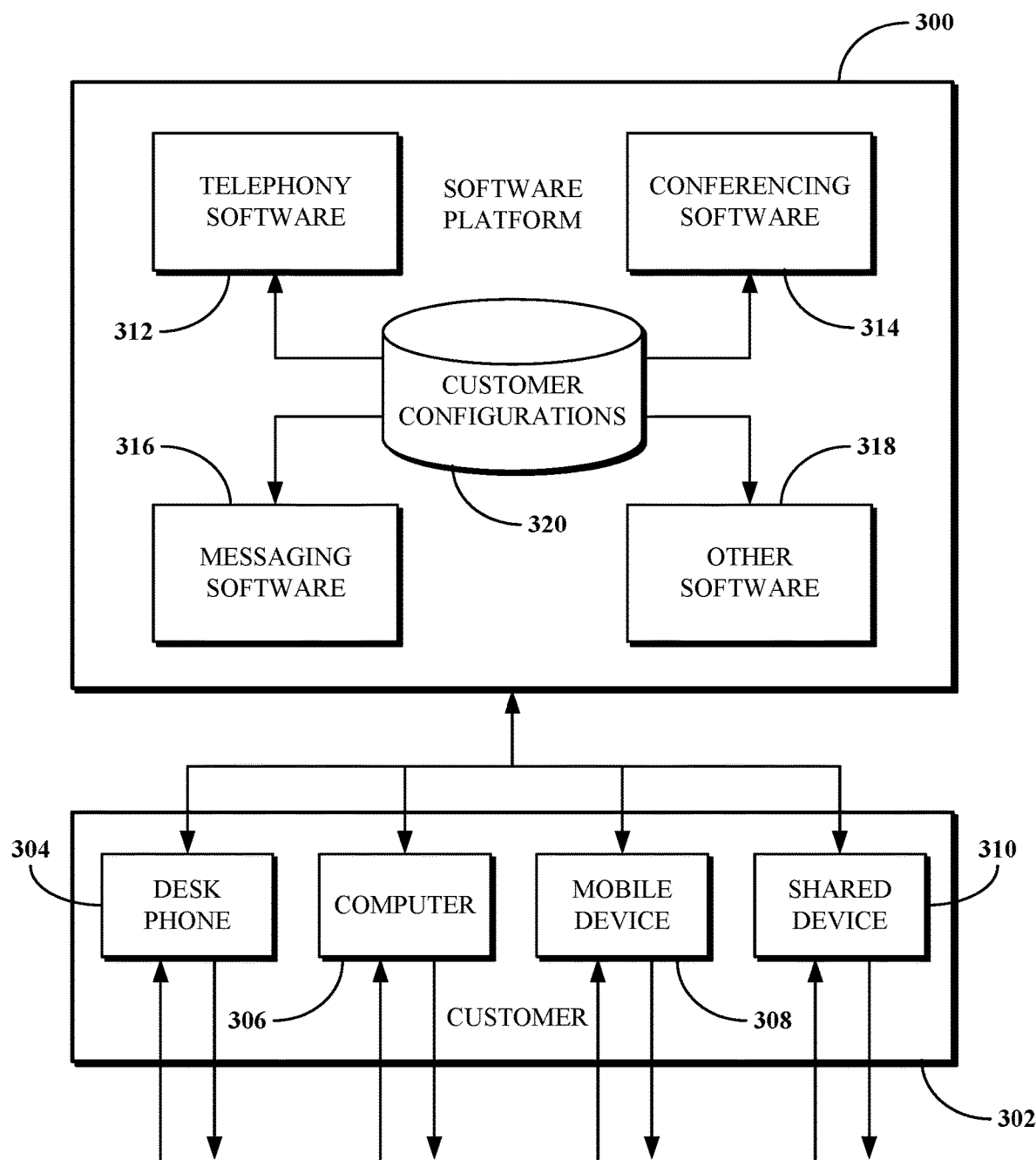
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for connecting a user device to an agent device at a contact center based on features provided by the user of the user device or based on a priority score of the user.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
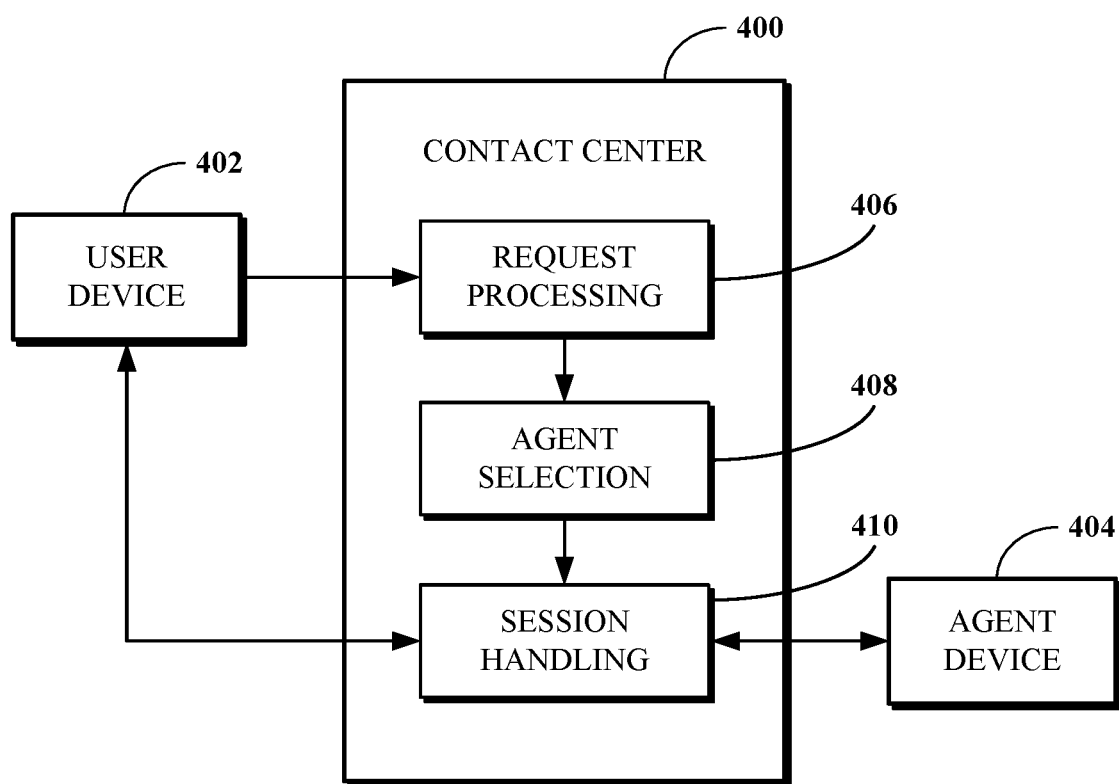
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400, for example, telephony, video, text messaging, chat, and social media. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The request may include a natural language query or a request entered in another manner (e.g., "press 1 to pay a bill, press 2 to request service"). The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request (e.g., the natural language query) via text and thereafter process the text entered by the user device 402 using natural language processing and/or other processing.

The session handling software 410 establishes a connection between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
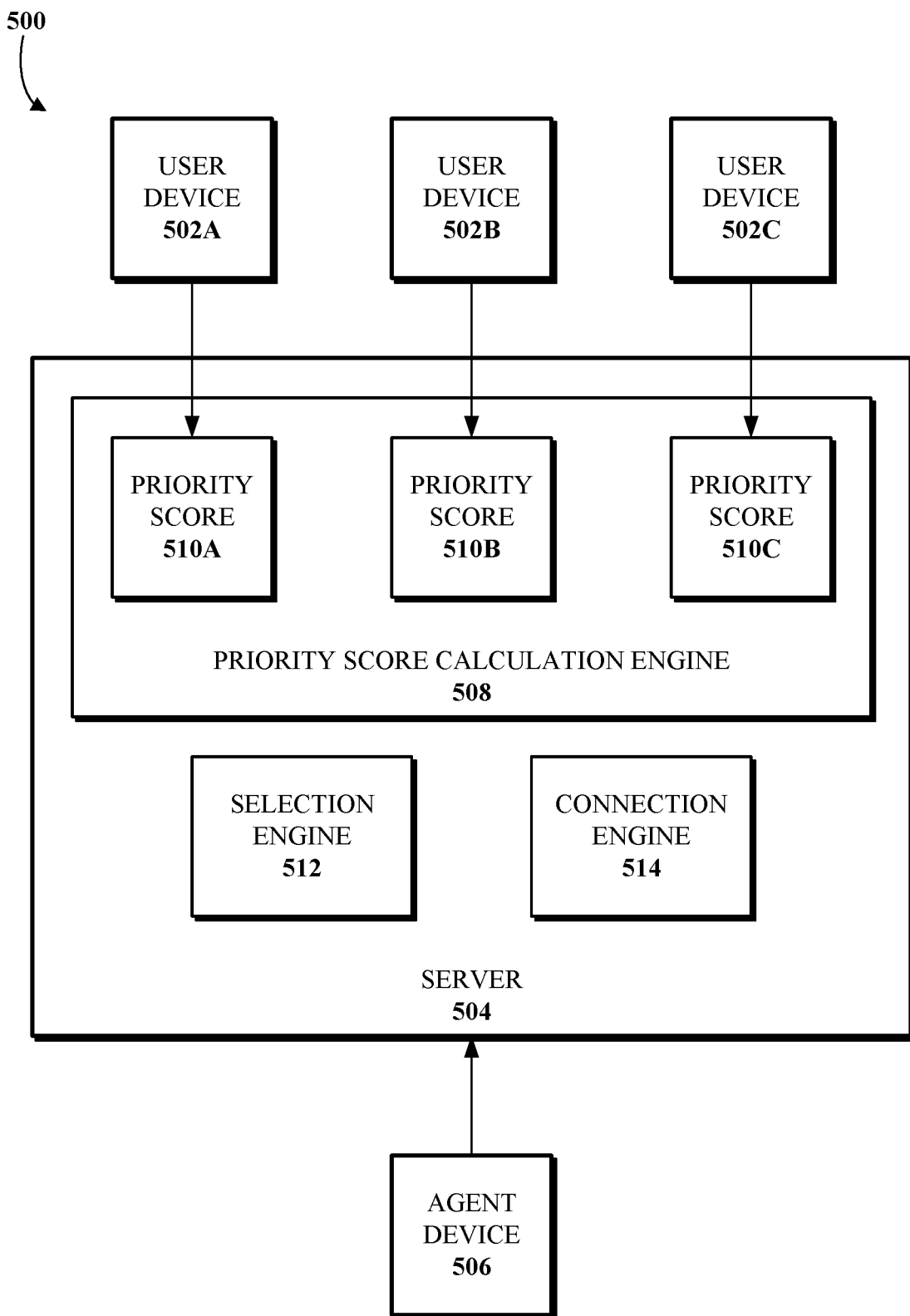
FIG. 5 is a block diagram of an example of a contact center system for connecting a user device to an agent device.

FIG. 5 is a block diagram of an example of a contact center system 500 for connecting a user device to an agent device. As shown, the system 500 includes user devices 502A-C, a server 504, and an agent device 506. The user devices 502A-C, the server 504, and the agent device 506 may communicate with one another over a communication service (e.g., one of the communication services implemented using UCaaS technology as described in conjunction with FIGS. 1-4), for example, telephony, video conferencing, or chat messaging. Each of the user devices 502A-C may correspond to the user device 402. The server 504 may perform at least one of the request processing software 406, the agent selection software 408, or the session handling software 410 functions of the contact center 400. The agent device 506 may correspond to the agent device 404.

Each user device 502A-C connects to the server 504 and requests connection with an agent device 506. The manner by which a user device 502A-C connects to the server 504 is based on the particular communication service (i.e., modality) over which the connection with an agent device is requested. For example, to connect to the server 504, each user device 502A-C may dial a telephone number associated with the server 504, visit a website or navigate a hyperlink associated with a conference instance to be implemented by the server 504, or access the server 504 via a messaging address in a text, audio or video messaging service. The server 504 prompts the user of each user device 502A-C to provide account information associated with the user and a query representing the reason of the user for initiating the contact center engagement. The account information may include an account identifier or account number (along with an account password or other authentication information (e.g., a one-time code transmitted to a mobile device via short messaging service or to an authentication application at the mobile device) to authenticate the user and reduce the probability of fraud) that can be used to determine a priority level (e.g., gold, silver or bronze) associated with the user device 502A-C. Alternatively, the server 504 may store data (e.g., a telephone number or a messaging address) that maps the user device to an account and its priority level. In some cases, if no account identifier is provided or available for the user device 502A, the user device 502A may be assigned to the lowest priority level.

The priority level may be determined based on the user's level of engagement or monetary spending with a business associated with the contact center. For example, an airline might assign users to a gold priority level, a silver priority level, or a bronze priority level based on a distance flown with the airline in the prior calendar year. In another example, a clothing retailer might assign users to a premium priority level if they spent more than $500 with the clothing retailer in the last six months and might assign users to a base priority level otherwise. In yet another example, a bank might assign users to a premium priority level if they already have an account with the bank and might assign users to a base priority level otherwise, as the bank might prioritize serving its current customers over potential new customers. Alternatively, if the bank is actively seeking new customers and less concerned with retaining existing customers, the bank might assign users to the premium priority level if they lack the account with the bank and might assign users having the account with the bank to the base priority level.

As shown, the server 504 includes a priority score calculation engine 508. The priority score calculation engine 508 periodically (e.g., whenever the agent device 506 or another agent device becomes available or once per minute or other time period) calculates a priority score 510A-C for each user device 502A-C. The priority score 510A is calculated based on a priority level of the user device 502A and an amount of time the user device 502A spent waiting to be connected to the agent device 506. For example, the priority score P may be calculated using the formula $P=b*t$, where t is the time spent waiting and b is a slope selected based on the priority level. The time spent waiting may be determined based on a time difference between a current time and a time when the user device 502A started waiting or when the user device 502A initiated the contact center engagement. In one specific example, the slope b is equal to 3 for the gold priority level, 2 for the silver priority level, and 1 for the bronze priority level. Alternatively, the slope b may be 1.5 for the premium priority level and 1.1 for the base priority level. The priority score 510B for the user device 502B and the priority score 510C for the user device 502C are calculated using techniques similar to those described above.

When the agent device 506 (or another agent device) becomes available, for example, by terminating a communication session with another user device or by indicating that the agent is online (e.g., to begin their workday), a selection engine 512 is used to select one of the user devices 502A-C waiting to be connected to an agent device for connection to the available agent device 506. The selection engine 512 selects one of the user devices 502A-C based on the priority scores 510A-C of the user devices, as calculated by the priority score calculation engine 508. For example, the selection engine 512 may select the user device having the highest priority score. The selection engine 512 notifies a connection engine 514 of the selected user device. The connection engine 514 then connects the selected user device to the agent device 506, and a communication session between selected the user device and the agent device 506 begins.

Figure 6:
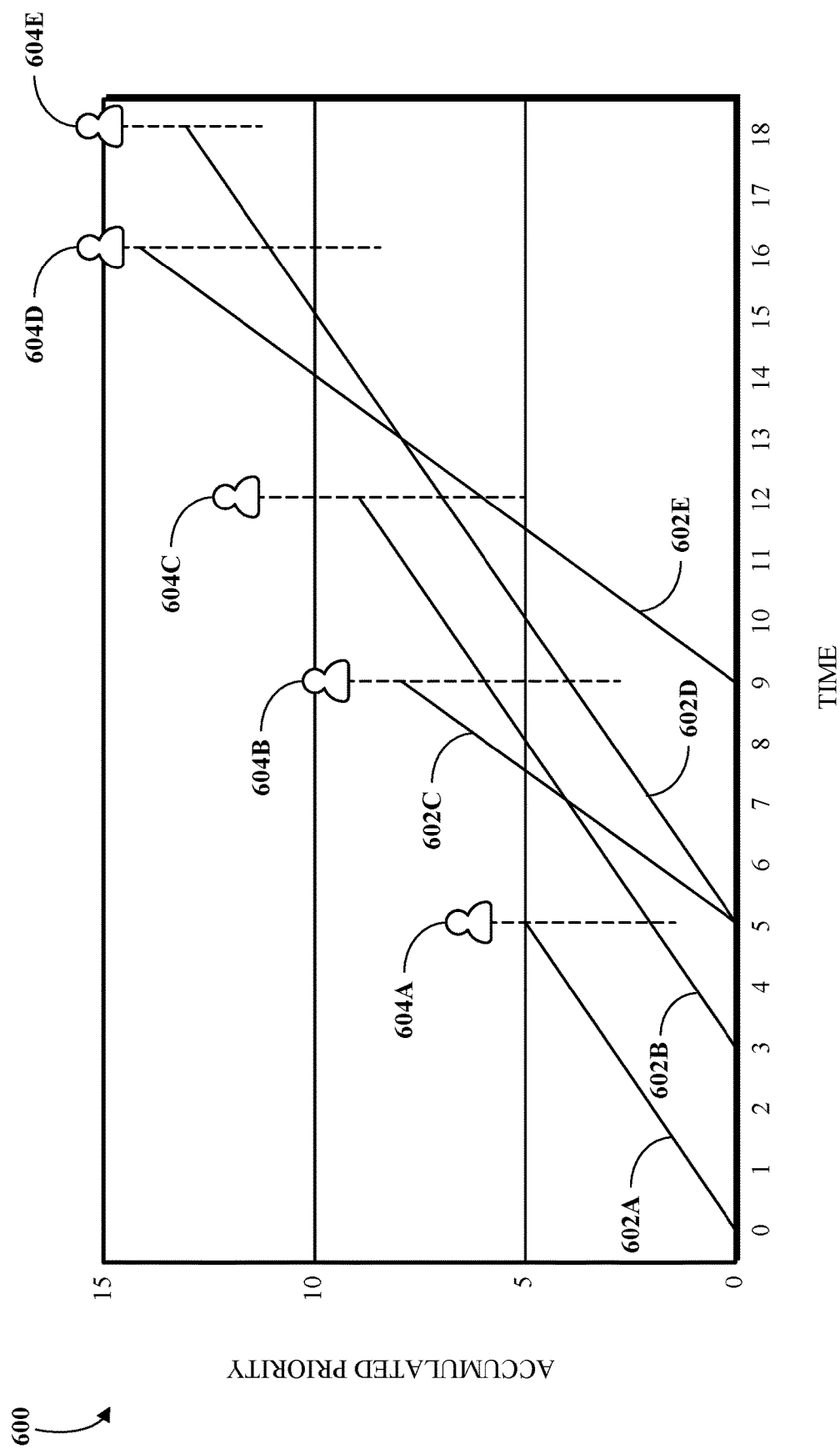
FIG. 6 illustrates an example graph of accumulated priority versus time.

FIG. 6 illustrates an example graph 600 of accumulated priority versus time. The example graph 600 corresponds to an example use case of connecting user devices to agent devices in a contact center, which may be implemented using the contact center system 500.

As shown, the graph includes a time axis (incremented in minutes) and an accumulated priority axis. The time axis begins at time=0, when a user device 602A initiates a contact center engagement and attempts to connect with an agent. The user device 602A is assigned a slope of 1 based on the user device 602A being associated with a user who lacks a priority level (or has a base priority level) with an entity associated with the contact center. Time=0 may correspond to an initial point in time, for example, 9:00 AM Eastern Time on Tuesday, Jan. 17, 2023.

At time=3, a user device 602B initiates a contact center engagement and attempts to connect with an agent. The user device 602B is assigned a slope of 1 based on the user device 602B being associated with a user who lacks the priority level or has the base priority level.

At time=5, two additional user devices 602C and 602D initiate a contact center engagement and attempt to connect with an agent. The user device 602C is assigned a slope of 2 based on the user device 602C being associated with a user who has a premium priority level. The user device 602D is assigned a slope of 1 based on the user device 602B being associated with a user who lacks the priority level or has the base priority level.

Also at time=5, an agent device 604A becomes available (e.g., due to the agent of the agent device 604A leaving another contact center engagement or beginning their work session). The priority scores of the user device 602A is equal to 5, as the user device 602A was assigned a slope of 1 and has been waiting for 5 minutes. The priority score of the user device 602B is equal to 2, as the user device 602B was assigned a slope of 1 and has been waiting for 2 minutes. The priority score of the user device 602C is equal to 0, as the user device was assigned a slope of 2 and has been waiting for 0 minutes. The priority score of the user device 602D is equal to 0, as the user device 602D was assigned a slope of 1 and has been waiting for 0 minutes. Thus, the user device 602A has the highest priority score and is selected for connection (and later connected) to the agent device 604A.

At time=9, a user device 602E initiates a contact center engagement and attempts to connect with an agent. The user device 602E is assigned a slope of 2 based on the user device 602C being associated with a user who has a premium priority level.

Also at time=9, an agent device 604B becomes available. As illustrated, the user device 602C has the highest priority score and, thus, is selected for connection (and later connected) to the agent device 604B. It should be noted that, while the user device 602C has the highest priority score, the user device 602B was waiting for a longer time period than the user device 602C. However, the user of the user device 602C has a higher priority level and, thus, was chosen for faster service by an entity associated with the contact center.

At time=12, an agent device 604C becomes available. As illustrated, the user device 602B has a higher priority score than the other user devices 602D and 602E waiting for the agent device. Thus, the user device 602B is selected for connection to the agent device 604C and connected to the agent device 604C.

At time=16, an agent device 604D becomes available. As illustrated, the user device 602E has a higher priority score than the user device 602D. Thus, the user device 602E is selected for connection and later connected to the agent device 604D. The priority score of the user device 604D is equal to the slope 1 multiplied by the difference between 16 (current time) and 5 (time when the user of the user device 604D started waiting), resulting in 11. The priority score of the user device 604E is equal to the slope 2 multiplied by the difference between 16 (current time) and 9 (time when the user of the user device 604E started waiting), resulting in 14.

At time=18, an agent device 604E becomes available. The user device 602D is the only user device waiting for an agent device. Thus, the user device 602D is selected for connection to the agent device 604E. the user device 602D is connected to the agent device 604E.

In one example, the contact center is associated with a rental car agency. The rental car agency grants blue status to all users and platinum status to users who completed at least five rentals in the last year. The user devices 602A, 602B, and 602D having the slope of 1 are associated with users who lack a status, have blue status, or were not associated with proper user identifier with the rental car agency. The user devices 602C and 602E having the slope of 2 are associated with users who have platinum status. These users were authenticated (e.g., based on at least one of a phone number, a user identifier, a password, or a one-time code) as having the platinum status. As a result, the users with platinum status are assisted more quickly, resulting in a better user experience for those users and making them more likely to continue doing business with the rental car agency.

In another example, the contact center is associated with a mobile network operator that is seeking new subscribers. The user devices 602A, 602B, and 602D having the slope of 1 are associated with users who are already subscribers of the mobile network operator, while the user devices 602C and 602E having the slope of 2 are associated with users who are not identified as subscribers. As a result, the mobile network operator is able to service non-subscriber users (or users who were not identified as subscribers) more quickly, resulting in a better user experience for the non-subscriber users and making it more likely that those users initiate subscriptions.

Figure 7:
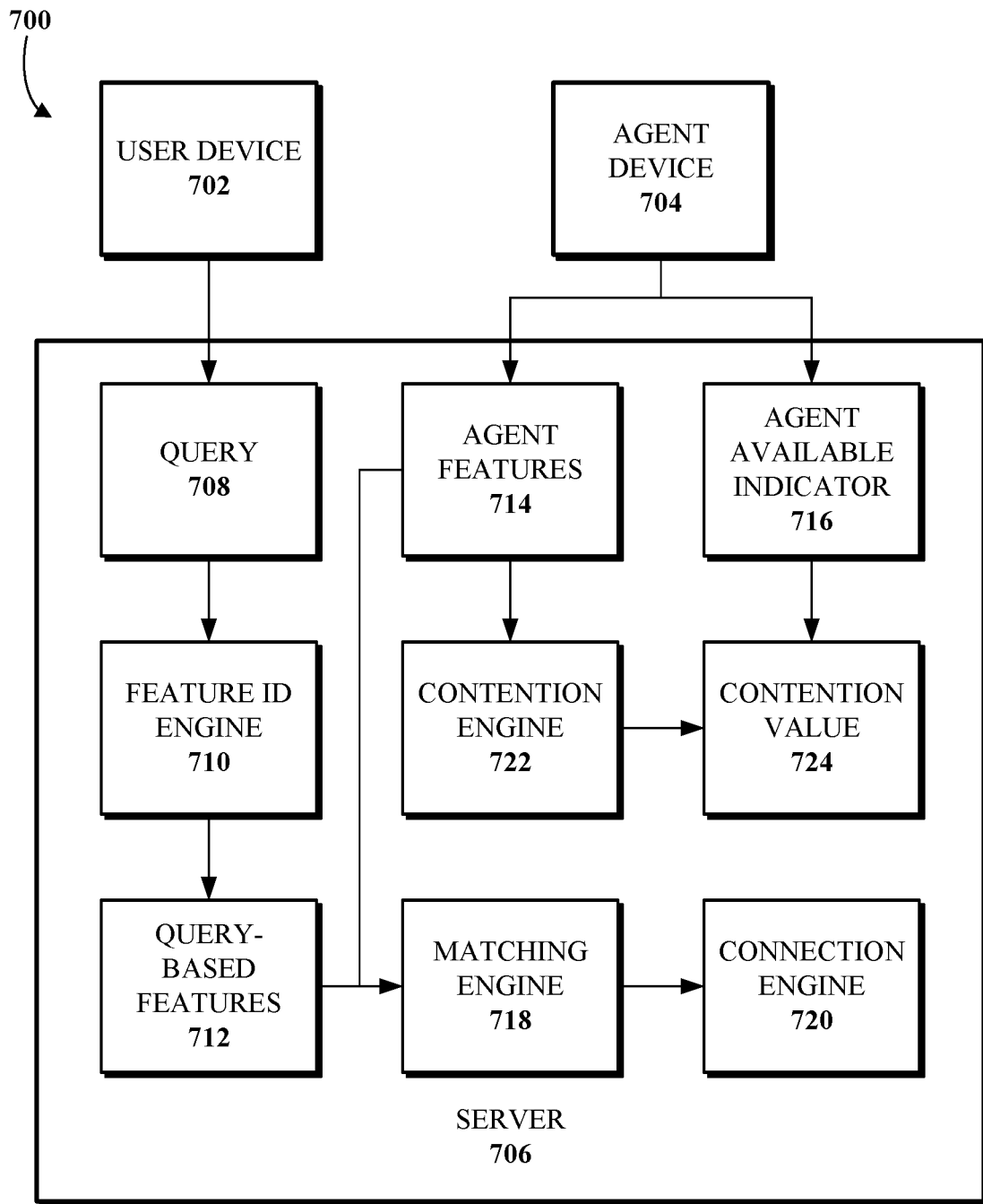
FIG. 7 is a block diagram of an example of a contact center system for matching a user device to an agent device.

FIG. 7 is a block diagram of an example of a contact center system 700 for matching a user device to an agent device. As shown, the contact center system 700 includes a user device 702, an agent device 704, and a server 706. The user device 702 may correspond to one of the user devices 502A-C or the user device 402. The agent device 704 may correspond to the agent device 506 or the agent device 404. The server 706 may correspond to the server 504 and/or may implement at least one of request processing software 406, agent selection software 408, or session handling software 410 as described in conjunction with FIG. 4.

As shown in FIG. 7, the user device 702 initiates a contact center engagement by connecting to the server 706 (e.g., via the PSTN or via network-based text, audio, or video communication software). Upon connection and in response to a prompt, the user device 702 transmits the query 708 to the server 706. The query indicates a reason for the contact center engagement. For example, the query 708 may include an audio recording of the user saying, in English, "I need assistance with installing the company's application on my mobile phone."

The query 708 is provided to a feature identification (ID) engine 710 at the server 706. The feature ID engine 710 identifies query-based features 712 for an agent to have based on the query 708. The feature ID engine 710 may leverage at least one of an artificial neural network, a convolutional neural network, a deep neural network, and a natural language processing (NLP) engine to identify the query-based features. For example, based on the query being in English, the feature ID engine 710 may add ability to speak English to the query-based features. In addition, the query, "I need assistance with installing the company's application on my mobile phone," may map to the query-based features 712 including at least one of: technology support, mobile phone support, mobile phone application support, or installation support.

The server stores agent features 714 for each agent device 704 associated with the agent. The agent features 714 may include at least one of a skill (e.g., a language skill or a technical skill), a seniority level, permission to access data, or permission to modify the data. When the agent device 704 becomes available for communication, the agent available indicator 716 for the agent device 704 is set to true or available (as opposed to false or unavailable).

In response to the user device 702 waiting for connection to an agent and the agent device 704 having its agent available indicator 716 set to true, a matching engine 718 accesses the query-based features 712 and the agent features 714 to determine if there is a match between the query-based features 712 and the agent features 714. The matching engine 718 determines if the agent of the agent device 704 would be able to support the user of the user device 702 based on the agent features 714 and the query-based features 712. If the agent is able to support the user, the connection engine 720 connects the user device 702 with the agent device 704 for text, audio, or video communication between the user and the agent.

As further illustrated in FIG. 7, the agent features are provided to a contention engine 722 to determine contention, among user devices (including the user device 702), for agent devices (including the agent device 704) having the agent features 714. The contention engine may determine a contention value 724 based on at least one of: an AWT for a user device to connect with an agent device, a number of user devices, a number of agent devices having certain features (e.g., working in the lending department and speaking French). The AWT may correspond to an average hold time that an agent spends speaking to a user multiplied by the number of user devices divided by the number of agent devices.

If the contention value 724 exceeds a threshold contention value, it may be desirable to provide a callback to one or more user devices at a later time, in order to reduce the contention value and service the users with urgent queries faster. In some implementations, the server 706 determines that contention for the agent having the agent features 714 exceeds the threshold contention value. The server 706 determines, based on the query 708 or other data provided from the user device (e.g., a response, by the user, to a prompt to specify whether the query 708 is urgent), that the query 708 is other than urgent. The server 706 transmits, to the user device and based on the determination that the query is other than urgent, a prompt to accept a callback at a time when contention for the agent having the agent features 714 is below the threshold contention value. The user could be presented with several time options for the callback using at least one of a displayed menu, a text-based menu, or an IVR menu provided to the user device 702. The user may also be prompted to provide a telephone number or messaging address for receiving the callback. In response to the user's acceptance of the callback prompt, the user may be provided with a callback at the selected time and using the provided telephone number or messaging address.

FIG. 8 illustrates an example of a user interface 800 for managing wait times of groups of users. The user interface 800 may be presented at an administrator device of a contact center, such as the contact centers described in conjunction with FIG. 4, FIG. 5, or FIG. 7. As shown, the user interface 800 includes input boxes for the user of the administrator device to enter target wait times for users associated with the gold, silver, and bronze priority levels. As shown, the user has entered the target wait times for the gold, silver, and bronze priority levels. As shown, the slope input boxes are displayed with dashed lines to indicate that these values are calculated (by the server) rather than being input by the user. To calculate the slope, as well as the predicted future AWT, the server may run a simulation to determine the slopes for the gold, silver, and bronze users that would bring the predicted future AWT as close to the input target wait time as possible. In some cases, the server may attempt to minimize the sum of the square of the differences between each predicted AWT and the target wait time, i.e. (predicted future AWT for gold—target wait time for gold)^2+ (predicted future AWT for silver-target wait time for silver)^2+ (predicted future AWT for bronze—target wait time for bronze)^2. The simulation may be executed based on data from a previous time period (a previous week or month) of times when agent devices were logged on, times when agent devices were available, and times when user devices initiated contact center engagements. In some cases, multiple different slope values may be simulated in order to minimize the sum of the square of the differences between each predicted AWT and the target wait time. Initial slope values may be set to a predetermined value and then adjusted until a local minimum of the sum of the square of the differences between each predicted AWT and the target wait time is reached. In alternative implementations, the user may enter slopes in place of the target wait times, and the slopes may be used to directly calculate the predicted future AWT using the simulation technique.

It should be noted that the predicted future AWT for a given priority level (e.g., gold) may be calculated based on the target wait times and/or the slopes of some or all of the priority levels (e.g., gold, silver, and bronze), as the wait times of gold-level users are impacted by the slopes and target wait times of users at other levels that compete with the gold-level users to get access to an agent. For example, if the slope for the bronze level or the silver level is increased, the predicted future AWT for gold-level users may decrease.

Figure 9:
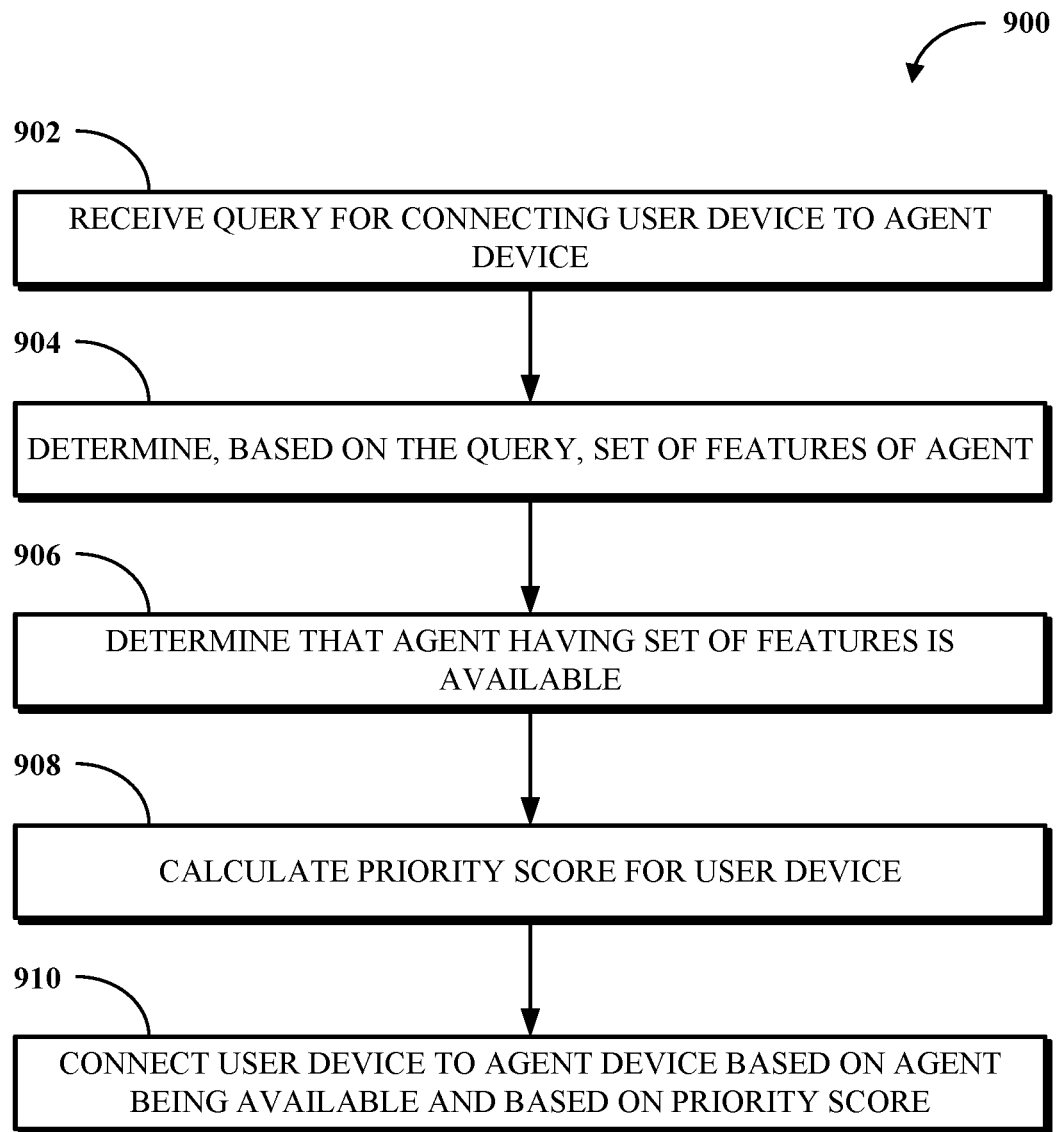
FIG. 9 is a flowchart of an example of a technique for connecting a user device to an agent device based on agent features.
Figure 10:
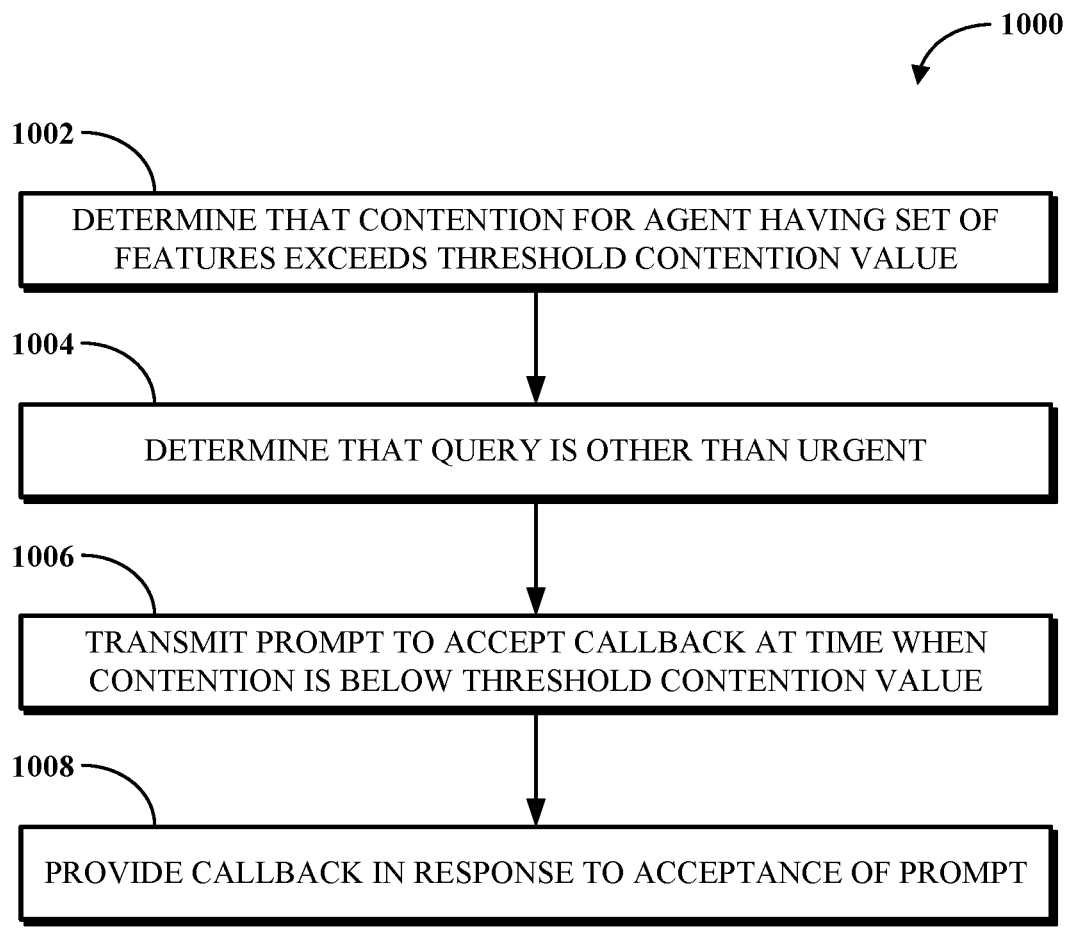
FIG. 10 is a flowchart of an example of a technique for providing a callback to a user device.
Figure 11:
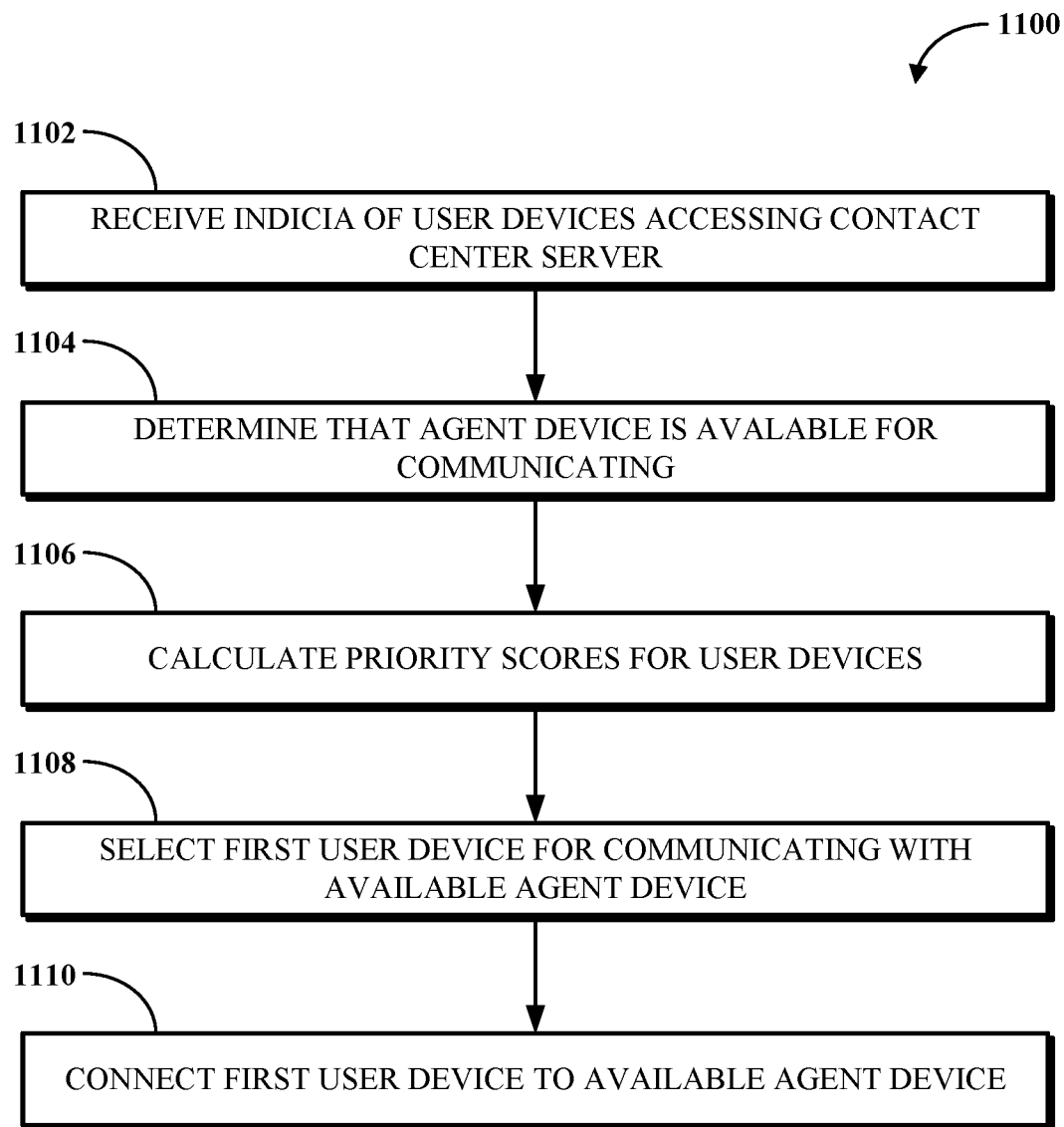
FIG. 11 is a flowchart of an example of a technique for connecting a user device to an agent device based on a priority score.
Figure 12:
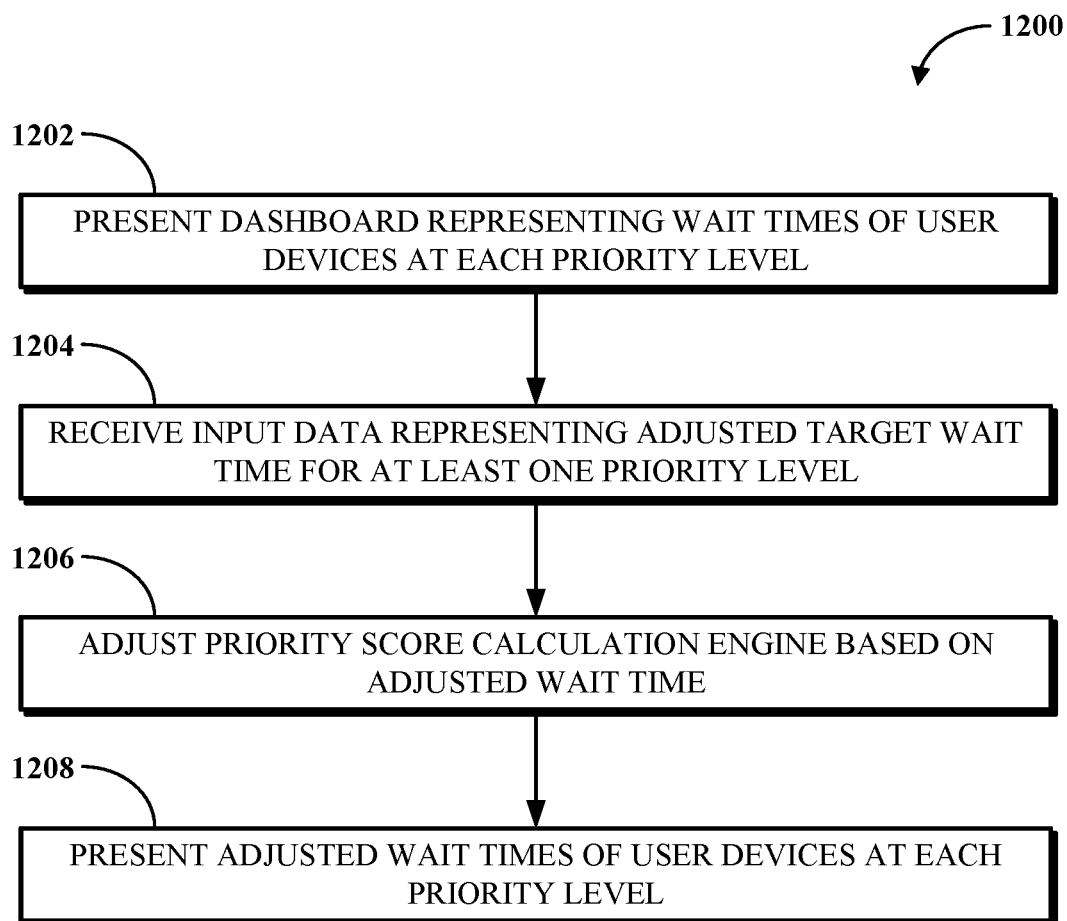
FIG. 12 is a flowchart of an example of a technique for managing wait times for groups of users.

To further describe some implementations in greater detail, reference is next made to examples of techniques which may be performed by a system for connecting a user device to an agent device at a contact center based on features provided by the user of the user device or based on a priority score of the user. FIG. 9 is a flowchart of an example of a technique 900 for connecting a user device to an agent device based on agent features. FIG. 10 is a flowchart of an example of a technique 1000 for providing a callback to a user device. FIG. 11 is a flowchart of an example of a technique 1100 for connecting a user device to an agent device based on a priority score. FIG. 12 is a flowchart of an example of a technique 1200 for managing wait times for groups of users. The techniques 900, 1000, 1100, and/or 1200 can be executed using computing devices, such as the systems, hardware, and software described with respect to FIGS. 1-8. The techniques 900, 1000, 1100, and/or 1200 can be performed, for example, by executing a machine-readable program or other computer-executable instructions, such as routines, instructions, programs, or other code. The steps, or operations, of the techniques 900, 1000, 1100, and/or 1200 or another technique, method, process, or algorithm described in connection with the implementations disclosed herein can be implemented directly in hardware, firmware, software executed by hardware, circuitry, or a combination thereof.

For simplicity of explanation, the techniques 900, 1000, 1100, and/or 1200 are depicted and described herein as series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 9 illustrates the technique 900 for connecting a user device to an agent device based on agent features. The technique 900 may be performed at a server (e.g., the server 504 or the server 706) of a contact center (e.g., the contact center 400).

At 902, the server receives a query for connecting a user device to an agent device. The query may be a natural language phrase that is typed or spoken by a user of the user device in response to a prompt to specify a reason for a contact center engagement. In some cases, the query may include information selected by a user device from a displayed menu or an IVR menu.

At 904, the server determines, based on the query, a set of features of an agent associated with the agent device. The set of features may include at least one of a language skill, a technical skill, a seniority level, permission to access data (e.g., data stored by an entity associated with the contact center, such as the user's shipping address or billing information), or permission to modify the data. The language skill may be identified based on natural language text or speech in the query. For example, if the user is speaking German, they would likely benefit from having access to a German-speaking agent. Other features may be determined by providing natural language text or speech from the query to a NLP engine. For example, if the query includes the text or audio, "Please stop charging my credit card," the NLP engine may determine that the user wishes to update their billing information or cancel their subscription, and might determine that the agent features are to include the agent being authorized to cancel the subscription or update the billing information.

At 906, the server determines that the agent having the set of features is available. The agent may become available based on the agent logging in to their agent device and indicating that they are available to being a workday or a work session. Alternatively, the agent may become available upon termination of a contact center engagement between the agent device of the agent and another user device. An indicator of agent availability (e.g., the agent available indicator 716) may be stored at the server to indicate whether each agent is available. The server may also store a set of features (e.g., the agent features 714) of each agent and compare those features with the set of features identified for each query.

In some cases, the agent is selected such that the set of features determined based on the query is at least a subset of the set of features of the agent. For example, the set of features determined from the query may include: speaks Spanish, authorized to issue refund, and works in grocery department. The set of features of the agent selected to communicate with the user having this query may include: speaks Spanish, speaks French, authorized to issue refund, authorized to modify account information, works in grocery department, and capable of recommending grocery substitutes.

At 908, the server calculates a priority score for the user device. The priority score may be calculated using the techniques disclosed herein, for example, in conjunction with FIGS. 5-6. The server may calculate the priority score for multiple user devices, for example, all or a portion of the user devices that submitted queries that were mapped to features corresponding to the features of the agent using the agent device. In some examples, the priority score is calculated based on an elapsed time since the user device initiated a contact center engagement and additional stored data associated with the user device. The additional stored data may include, for example, a priority level of an account associated with the user device.

At 910, the server connects the user device to the agent device based on the agent being available and based on the priority score for the user device exceeding a priority score for at least one other user device. The connection of the user device to the agent device may be based on a match of the set of features determined from the query and the set of features of the agent of the agent device. In some cases, the user device having the highest priority score (of all the user devices that submitted queries that were mapped to features corresponding to the features of the agent using the agent device) is connected to the agent device. Alternatively, in some cases, a user with a unique need to be connected to a specific agent may be able to "skip ahead" of users with higher priority scores to be connected with the agent. For example, a grocery delivery service may have hundreds of agents only one of whom speaks Korean. If a Korean-speaking user access the contact center of the grocery delivery service and the Korean speaking agent becomes available, the user might be connected with the Korean-speaking agent (ahead of other users with higher priority scores who do not necessarily require the Korean-speaking agent) to ensure that the contact center is able to service the Korean-speaking user.

In some cases, there may be contention for an agent having a set of features. For example, if multiple Korean-speaking users access the contact center of the grocery delivery service and there is a single Korean-speaking agent available, it might take the agent a long time to respond to the queries of all of the Korean-speaking users. Alternatively, it might not be possible for the agent to respond based on the agent's remaining work hours and the expected duration of each communication session with the agent and a user. In these cases, it may be desirable to provide a callback to some of the Korean-speaking users at a different time when there is less contention. FIG. 10 illustrates the technique 1000 for providing a callback to a user device.

In some cases, there may be a "tie" of two or more user devices having the same priority score, and that priority score exceeding the priority score of all of the other user devices waiting for agent devices (if there are such other user devices). In these cases, one of the user devices may be selected for connection with the agent device using a random or pseudo-random technique. For example, a random or pseudo-random number generator may be used, with each of the tied user devices being assigned a unique number between 1 and n (where n is the number of tied user devices), and a number being selected using a random or pseudo-random technique. The user device matching the selected number is then selected to connect to the agent device.

At 1002, a server (e.g., the server 504 or the server 706) determines that contention for an agent having a set of features meets or exceeds a threshold contention value. The contention value may correspond to or be determined based on at least one of an average amount of time users spend waiting for connection to the agent, an average priority score of users waiting for connection to the agent, a number of users waiting for connection to the agent, or a number of agents having the set of features. In some examples, the contention value exceeds the threshold contention value if the average amount of time users spend waiting for connection to the agent exceeds ten minutes.

At 1004, the server determines, based on the query or other data provided from a user device, that a query provided by the user of the user device is other than urgent. In some cases, the user of the user device may be prompted to specify whether their query is urgent using at least one of text-based chat messages, a user interface icon displayed on a display unit, or an IVR menu. Alternatively, NLP technology may be applied to the query to determine if the query is urgent. For example, in a banking context, a user accessing the contact center to report a stolen check book might have an urgent query, while a user accessing the contact center to open a new bank account might have an other than urgent query.

At 1006, the server transmits, to the user device based on the determination that the query is other than urgent, a prompt to accept a callback at a time when the contention for the agent having the set of features is below the threshold contention value. In some cases, the user may be prompted to specify a time or a set of times when they would like to receive the callback. In some cases, the user may be presented with several options indicating times when contention for the agent is expected (e.g., based on historical trends) to be low. In some cases, the user may be able to select, on a calendar of an agent having the features determined based on the user's query, a time for the callback from a set of times when the agent is expected to be available.

At 1008, the server provides the callback to the user device in response to acceptance of the prompt. The callback may be provided at the time selected by the user. In some cases, the user specifies a telephone number or communication address (e.g., in a communication application) for receiving the callback. In some cases, the telephone number or the communication address from which the user device is accessing the contact center is used for the callback.

FIG. 11 illustrates the technique 1100 for connecting a user device to an agent device based on a priority score. The technique 1100 may be preformed by a server of a contact center, for example, the server 504.

At 1102, the server receives indicia of user devices accessing the server. The user devices may access the server using at least one of the PSTN, a communication application, a messaging application, a voice calling application, or a video calling application. The user devices may access the server in order to communicate with an agent at an agent device.

At 1104, the server determines that the agent device is available for communicating with one of the user devices. The agent device may become available upon terminating a communication session with another user device. The server may now select one of the user devices for connection to the agent device.

At 1106, the server calculates, for at least a subset of the user devices, a priority score based on an elapsed time since the user device initiated a contact center engagement and a priority level of an account associated with the user device. The priority score may be calculated based on a slope value for the priority level (e.g., with the priority score being equal to a product of the slope value and the elapsed time). The slope value may be set by an administrator device using an administrator dashboard (e.g., as illustrated in FIG. 8). Alternatively, instead of being input directly at the administrator device, the slope value may be calculated based on a target wait time for the priority level input at the administrator device. Simulation techniques (e.g., Monte Carlo simulation) may be applied to data from a prior time period (e.g., the last week, the last month, or the same month as the current month in the prior calendar year) in order to select a slope value that will result in wait times for each priority level being proximate (e.g., as close as possible or within 10% of the as close as possible value) to the target wait times provided by the administrator device. FIG. 12, described below, relates to a technique for managing, via an administrator dashboard at an administrator device, wait times for users at different priority levels.

At 1108, the server selects, based on the calculated priority scores, a first user device for communicating with the available agent device. For example, the user device with the highest priority score may be selected. Alternatively, the user device with the lowest priority score or the priority score closest to a target priority score may be selected.

At 1110, the server connects the first user device to the available agent device. For example, the server may initiate a communication session between the first user device and the available agent device. Alternatively, in a PSTN-based contact center, a call from the first user device may be forwarded or connected to the available agent device.

FIG. 12 illustrates the technique 1200 for managing wait times for groups of users. The groups may be defined by priority level. The technique 1200 may be performed at a server of a contact center, for example, a server of the contact center 400, the server 504, or the server 706.

At 1202, the server presents, at an administrator device, a dashboard representing wait times of user devices associated with accounts at each priority level. For example, the dashboard shown in FIG. 8 may be used. Alternatively, a more detailed dashboard that includes graphical representations of wait times versus number of users at each priority level may be used.

At 1204, the server receives, from the administrator device, input data representing an adjusted target wait time for at least one priority level. The input data may include a target wait time for each priority level and may be entered, by a user of the administrator device, using input boxes presented on a user interface of the administrator device. Alternatively, adjusted slopes (for calculating the priority score, as described herein) may be received in place of the adjusted wait times.

At 1206, the server adjusts a priority score calculation engine (e.g., the priority score calculation engine 508) that calculates the priority score based on the adjusted target wait time (or the adjusted slope). In some cases, the priority score calculation engine calculates the priority score for a user device based on a slope (determined based on the priority level) and the elapsed time spent waiting of the user device. The slope may be determined, using modeling techniques (e.g., simulation techniques such as Monte Carlo simulation), from the target wait time provided by the user device by using a simulation technique to minimize a mathematical function of differences between the target wait times and the predicted AWTs for each priority level.

At 1208, the server presents, via the dashboard, adjusted wait times (e.g., predicted future wait times) of the user devices associated with the accounts at each priority level based on the adjusted priority score calculation engine. The adjusted wait times may be presented as numbers on the user interface (e.g., as shown in FIG. 8) or, alternatively, in a graphical format indicating at least one of the mean, the median, the mode, or the standard deviation of the distribution of adjusted wait times for each priority level. If the user of the administrator device is not satisfied (e.g., due to the deviation between a predicted wait time and an input target wait time for at least one priority level exceeding a threshold) with the adjusted wait times, the user may adjust the input slopes or target wait times.

Some implementations are described below as numbered examples (Example 1, 2, 3, etc.). These examples are provided as examples only and do not limit the other implementations disclosed herein.

Example 1 is a method comprising: receiving a query for connecting a user device to an agent device at a contact center server; determining, based on the query, a set of features of an agent associated with the agent device; determining that the agent having the set of features is available; calculating a priority score for the user device based on an elapsed time since the user device initiated access to the contact center server and additional stored data associated with the user device; and connecting the user device to the agent device based on the agent being available and based on the priority score for the user device exceeding a priority score for at least one other user device.

In Example 2, the subject matter of Example 1 includes, wherein the set of features comprises at least one of: a language skill, a technical skill, a seniority level, permission to access information, or permission to modify the information.

In Example 3, the subject matter of Examples 1-2 includes, wherein determining the set of features comprises: identifying a language skill based on at least one of natural language text or speech in the query.

In Example 4, the subject matter of Examples 1-3 includes, wherein determining the set of features comprises: determining at least one feature by providing at least one of natural language text or speech from the query to a natural language processing engine.

In Example 5, the subject matter of Examples 1-4 includes, wherein the user device is one of multiple user devices waiting to be connected to the agent device, the method comprising: selecting the user device from the multiple user devices based on a match of the set of features determined from the query and the set of features of the agent.

In Example 6, the subject matter of Examples 1-5 includes, determining that contention for the agent having the set of features meets or exceeds a threshold contention value; determining, based on at least one of the query or other data provided from the user device, that the query is other than urgent; and transmitting, to the user device based on the determination that the query is other than urgent, a prompt to accept a callback at a time when the contention for the agent having the set of features is below the threshold contention value; and providing the callback to the user device in response to acceptance of the prompt.

In Example 7, the subject matter of Examples 1-6 includes, wherein the additional stored data associated with the user device comprises a priority level of an account associated with the user device.

Example 8 is a non-transitory computer readable medium storing instructions operable to cause one or more processors to perform operations comprising: receiving a query for connecting a user device to an agent device at a contact center server; determining, based on the query, a set of features of an agent associated with the agent device; determining that the agent having the set of features is available; calculating a priority score for the user device based on an elapsed time since the user device initiated access to the contact center server and additional stored data associated with the user device; and connecting the user device to the agent device based on the agent being available and based on the priority score for the user device exceeding a priority score for at least one other user device.

In Example 9, the subject matter of Example 8 includes, wherein the set of features comprises at least one of: a language skill, a technical skill, permission to access information, or permission to modify the information.

In Example 10, the subject matter of Examples 8-9 includes, wherein determining the set of features comprises: identifying a language skill based on natural language speech in the query.

In Example 11, the subject matter of Examples 8-10 includes, wherein determining the set of features comprises: determining at least one feature by providing natural language speech from the query to a natural language processing engine.

In Example 12, the subject matter of Examples 8-11 includes, wherein the user device is one of a plurality of user devices waiting to be connected to the agent device, the operations comprising: selecting the user device from the plurality of user devices based on a match of the set of features determined from the query and the set of features of the agent.

In Example 13, the subject matter of Examples 8-12 includes, the operations comprising: determining that contention for the agent having the set of features meets or exceeds a threshold contention value; determining, based on the query, that the query is other than urgent; and transmitting, to the user device based on the determination that the query is other than urgent, a prompt to accept a callback at a time when the contention for the agent having the set of features is below the threshold contention value; and providing the callback to the user device in response to acceptance of the prompt.

In Example 14, the subject matter of Examples 8-13 includes, wherein the additional stored data associated with the user device comprises a priority level.

Example 15 is an apparatus comprising: a memory; and a processor configured to execute instructions stored in the memory to: receiving a query for connecting a user device to an agent device at a contact center server; determining, based on the query, a set of features of an agent associated with the agent device; determining that the agent having the set of features is available; calculating a priority score for the user device based on an elapsed time since the user device initiated access to the contact center server and additional stored data associated with the user device; and connecting the user device to the agent device based on the agent being available and based on the priority score for the user device exceeding a priority score for at least one other user device.

In Example 16, the subject matter of Example 15 includes, wherein the set of features comprises at least one of: a language skill, a technical skill, or permission to access information.

In Example 17, the subject matter of Examples 15-16 includes, wherein determining the set of features comprises: identifying a language skill based on natural language text in the query.

In Example 18, the subject matter of Examples 15-17 includes, wherein determining the set of features comprises: determining at least one feature by providing natural language text from the query to natural language processing software.

In Example 19, the subject matter of Examples 15-18 includes, wherein the user device is one of multiple user devices waiting to be connected to the agent device, the processor configured to execute instructions stored in the memory to: select the user device from the multiple user devices based on the set of features determined from the query being at least a subset of the set of features of the agent.

In Example 20, the subject matter of Examples 15-19 includes, the processor configured to execute instructions stored in the memory to: determine that contention for the agent having the set of features meets or exceeds a threshold contention value; determine, based on at least one of the query or other data provided from the user device, that the query is other than urgent; and transmit, to the user device based on the determination that the query is other than urgent, a prompt to accept a callback when the contention for the agent having the set of features is below the threshold contention value; receive an indication of acceptance of the prompt; and provide the callback to the user device in response to the indication of the acceptance of the prompt.

Example 21 is a method comprising: receiving indicia of user devices accessing a contact center server; determining that a contact center agent device is available for communicating with a user device of the user devices; calculating, for at least a subset of the user devices, a priority score based on an elapsed time since the user device initiated a contact center engagement and a priority level of an account associated with the user device; selecting, based on the calculated priority scores, a first user device for communicating with the available agent device; and connecting the first user device to the available agent device via the contact center server.

In Example 22, the subject matter of Example 21 includes, wherein the priority score is calculated based on a target wait time for the priority level, the target wait time being set via a client device.

In Example 23, the subject matter of Examples 21-22 includes, receiving, from a client device, a target wait time for the priority level, wherein the priority score is calculated based on the elapsed time and the target wait time.

In Example 24, the subject matter of Examples 21-23 includes, presenting, at a client device, a dashboard representing wait times of user devices associated with accounts at each priority level; receiving, from the client device, input data representing an adjusted target wait time for at least one priority level; adjusting a priority score calculation engine that calculates the priority score based on the adjusted target wait time; presenting, via the dashboard, adjusted wait times of the user devices associated with the accounts at each priority level based on the adjusted priority score calculation engine.

In Example 25, the subject matter of Examples 21-24 includes, wherein the priority score is calculated based on a slope value for the priority level, the slope value being set via a client device.

In Example 26, the subject matter of Examples 21-25 includes, presenting, at a client device, a dashboard representing wait times of user devices associated with accounts at each priority level; receiving, from the client device, input data representing an adjusted slope value for at least one priority level; adjusting a priority score calculation engine that calculates the priority score based on the adjusted slope value; and presenting, via the dashboard, adjusted wait times of the user devices associated with the accounts at each priority level based on the adjusted priority score calculation engine.

In Example 27, the subject matter of Examples 21-26 includes, wherein determining that the contact center agent device is available for communicating with the user device comprises: determining, based on a query received from the user device, a set of features of an agent associated with the contact center agent device; and determining that the contact center agent device of the agent having the set of features is available for communication.

Example 28 is a non-transitory computer readable medium storing instructions operable to cause one or more processors to perform operations comprising: receiving indicia of user devices accessing a contact center server; determining that a contact center agent device is available for communicating with a user device of the user devices; calculating, for at least a subset of the user devices, a priority score based on an elapsed time since the user device initiated a contact center engagement and a priority level of an account associated with the user device; selecting, based on the calculated priority scores, a first user device for communicating with the available agent device; and connecting the first user device to the available agent device via the contact center server.

In Example 29, the subject matter of Example 28 includes, wherein the priority score is calculated based on target wait times for at least two priority levels, the target wait time being set via an administrator device.

In Example 30, the subject matter of Examples 28-29 includes, the operations comprising: receiving, from an administrator device, target wait times for at least two priority levels, wherein the priority score is calculated based on the elapsed time and the target wait times.

In Example 31, the subject matter of Examples 28-30 includes, the operations comprising: presenting, at an administrator device, a dashboard representing wait times of user devices associated with accounts at each priority level; receiving, from the administrator device, input data representing an adjusted target wait time for at least one priority level; adjusting a priority score calculation engine that calculates the priority score based on the adjusted target wait time; presenting, via the dashboard, adjusted wait times of the user devices associated with the accounts at each priority level based on the adjusted priority score calculation engine.

In Example 32, the subject matter of Examples 28-31 includes, wherein the priority score is calculated based on a slope value for the priority level, the slope value being set via an administrator device.

In Example 33, the subject matter of Examples 28-32 includes, the operations comprising: presenting, at an administrator device, a dashboard representing wait times of user devices associated with accounts at each priority level; receiving, from the administrator device, input data representing an adjusted slope value for at least one priority level; adjusting a priority score calculation engine that calculates the priority score based on the adjusted slope value; and presenting, via the dashboard, adjusted wait times of the user devices associated with the accounts at each priority level based on the adjusted priority score calculation engine.

In Example 34, the subject matter of Examples 28-33 includes, wherein determining that the contact center agent device is available for communicating with the user device comprises: determining, based on a query received from the user device, a set of skills of an agent associated with the contact center agent device; and determining that the contact center agent device of the agent having the set of skills is available for communication.

Example 35 is an apparatus comprising: a memory; and a processor configured to execute instructions stored in the memory to: receive indicia of user devices accessing a contact center server; determine that a contact center agent device is available for communicating with a user device of the user devices; calculate, for at least a subset of the user devices, a priority score based on an elapsed time since the user device initiated a contact center engagement and a priority level of an account associated with the user device; select, based on the calculated priority scores, a first user device for communicating with the available agent device; and connect the first user device to the available agent device via the contact center server.

In Example 36, the subject matter of Example 35 includes, wherein the priority score is calculated based on a target wait time for the priority level, the target wait time being set via an administrator device.

In Example 37, the subject matter of Examples 35-36 includes, the processor configured to execute instructions stored in the memory to: receive, from an administrator device, a target wait time for the priority level, wherein the priority score is calculated based on the elapsed time and the target wait time.

In Example 38, the subject matter of Examples 35-37 includes, the processor configured to execute instructions stored in the memory to: present, at a client device, a dashboard representing wait times of user devices associated with accounts at one or more priority levels; receive, from the client device, input data representing an adjusted target wait time for at least one priority level; adjust a priority score calculation engine that calculates the priority score based on the adjusted target wait time; and present, via the dashboard, adjusted wait times of the user devices associated with the accounts at each priority level based on the adjusted priority score calculation engine.

In Example 39, the subject matter of Examples 35-38 includes, wherein the priority score is calculated based on a slope value for the priority level.

In Example 40, the subject matter of Examples 35-39 includes, the processor configured to execute instructions stored in the memory to: presenting, at a client device, a dashboard representing wait times of user devices associated with accounts at one or more priority levels; receiving, from the client device, input data representing an adjusted slope value for at least one priority level; adjusting a priority score calculation engine that calculates the priority score based on the adjusted slope value; and presenting, via the dashboard, adjusted wait times of the user devices associated with the accounts at each priority level based on the adjusted priority score calculation engine.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   receiving a query for connecting a user device to an agent device at a contact center server;
   determining, based on the query, a set of features of an agent associated with the agent device;
   determining that the agent having the set of features is available;
   periodically calculating a priority score for the user device based on an elapsed time since the user device initiated a contact center engagement and additional stored data associated with the user device, wherein periodically calculated priority scores for multiple user devices determine selection of one of the multiple user devices for connection to the agent device; and
   connecting the user device to the agent device based on the agent being available and based on the priority score for the user device exceeding a priority score for at least one other user device.

2. The method of claim 1, wherein the set of features comprises at least one of: a language skill, a technical skill, a seniority level, permission to access information, or permission to modify the information.

3. The method of claim 1, wherein determining the set of features comprises:
identifying a language skill based on at least one of natural language text or speech in the query.

4. The method of claim 1, wherein determining the set of features comprises:
determining at least one feature by providing at least one of natural language text or speech from the query to a natural language processing engine.

5. The method of claim 1, further comprising:
selecting the user device from the multiple user devices based on a match of the set of features determined from the query and the set of features of the agent.

6. The method of claim 1, further comprising:
determining that contention for the agent having the set of features meets or exceeds a threshold contention value;
determining, based on at least one of the query or other data provided from the user device, that the query is other than urgent;
transmitting, to the user device based on the determination that the query is other than urgent, a prompt to accept a callback at a time when the contention for the agent having the set of features is below the threshold contention value; and
providing the callback to the user device in response to acceptance of the prompt.

7. The method of claim 1, wherein the additional stored data associated with the user device comprises a priority level of an account associated with the user device.

8. A non-transitory computer readable medium storing instructions operable to cause one or more processors to perform operations comprising:
receiving a query for connecting a user device to an agent device at a contact center server;
determining, based on the query, a set of features of an agent associated with the agent device;
determining that the agent having the set of features is available;
periodically calculating a priority score for the user device based on an elapsed time since the user device initiated a contact center engagement and additional stored data associated with the user device, wherein periodically calculated priority scores for multiple user devices determine selection of one of the multiple user devices for connection to the agent device; and
connecting the user device to the agent device based on the agent being available and based on the priority score for the user device exceeding a priority score for at least one other user device.

9. The non-transitory computer readable medium of claim 8, wherein the set of features comprises at least one of: a language skill, a technical skill, permission to access information, or permission to modify the information.

10. The non-transitory computer readable medium of claim 8, wherein determining the set of features comprises:
identifying a language skill based on natural language speech in the query.

11. The non-transitory computer readable medium of claim 8, wherein determining the set of features comprises:
determining at least one feature by providing natural language speech from the query to a natural language processing engine.

12. The non-transitory computer readable medium of claim 8, the operations comprising:
selecting the user device from the multiple user devices based on a match of the set of features determined from the query and the set of features of the agent.

13. The non-transitory computer readable medium of claim 8, the operations comprising:
determining that contention for the agent having the set of features meets or exceeds a threshold contention value;
determining, based on the query, that the query is other than urgent;
transmitting, to the user device based on the determination that the query is other than urgent, a prompt to accept a callback at a time when the contention for the agent having the set of features is below the threshold contention value; and
providing the callback to the user device in response to acceptance of the prompt.

14. The non-transitory computer readable medium of claim 8, wherein the additional stored data associated with the user device comprises a priority level.

15. An apparatus comprising:
a memory; and
a processor configured to execute instructions stored in the memory to:
receive a query for connecting a user device to an agent device at a contact center server;
determine, based on the query, a set of features of an agent associated with the agent device;
determine that the agent having the set of features is available;
periodically calculate a priority score for the user device based on an elapsed time since the user device initiated a contact center engagement and additional stored data associated with the user device, wherein periodically calculated priority scores for multiple user devices determine selection of one of the multiple user devices for connection to the agent device; and
connect the user device to the agent device based on the agent being available and based on the priority score for the user device exceeding a priority score for at least one other user device.

16. The apparatus of claim 15, wherein the set of features comprises at least one of: a language skill, a technical skill, or permission to access information.

17. The apparatus of claim 15, wherein to determine the set of features comprises to:
identify a language skill based on natural language text in the query.

18. The apparatus of claim 15, wherein to determine the set of features comprises to:
determine at least one feature by providing natural language text from the query to natural language processing software.

19. The apparatus of claim 15, wherein the processor further configured to execute instructions stored in the memory to:
select the user device from the multiple user devices based on the set of features determined from the query being at least a subset of the set of features of the agent.

20. The apparatus of claim 15, the processor further configured to execute instructions stored in the memory to:

determine that contention for the agent having the set of features meets or exceeds a threshold contention value;

determine, based on at least one of the query or other data provided from the user device, that the query is other than urgent;

transmit, to the user device based on the determination that the query is other than urgent, a prompt to accept a callback when the contention for the agent having the set of features is below the threshold contention value;

receive an indication of acceptance of the prompt; and provide the callback to the user device in response to the indication of the acceptance of the prompt.

\* \* \* \* \*